United States Patent
Graybeal et al.

(10) Patent No.: US 9,537,566 B2
(45) Date of Patent: Jan. 3, 2017

(54) REALIZING FDD CAPABILITY BY LEVERAGING EXISTING TDD TECHNOLOGY

(75) Inventors: John Graybeal, Califon, NJ (US); James Seymour, North Aurora, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1310 days.

(21) Appl. No.: 11/972,906

(22) Filed: Jan. 11, 2008

(65) Prior Publication Data
US 2009/0180408 A1 Jul. 16, 2009

(51) Int. Cl.
- H04J 1/00 (2006.01)
- H04B 7/26 (2006.01)
- H04L 5/14 (2006.01)
- H04W 72/12 (2009.01)
- H04W 84/04 (2009.01)

(52) U.S. Cl.
CPC .............. *H04B 7/2615* (2013.01); *H04L 5/14* (2013.01); *H04W 72/1257* (2013.01); *H04W 84/042* (2013.01)

(58) Field of Classification Search
CPC ............ H04B 7/2615; H04W 72/1257; H04W 84/042; H04L 5/14
USPC ........................................ 370/337, 344, 347
See application file for complete search history.

(56) References Cited

U.S. PATENT DOCUMENTS

| | | | | |
|---|---|---|---|---|
| 4,763,322 | A * | 8/1988 | Eizenhofer | 370/337 |
| 6,226,274 | B1 * | 5/2001 | Reese et al. | 370/280 |
| 6,587,444 | B1 * | 7/2003 | Lenzo et al. | 370/330 |
| 6,859,655 | B2 * | 2/2005 | Struhsaker | 455/450 |
| 2007/0058584 | A1 | 3/2007 | Sutskover | |
| 2007/0097887 | A1 * | 5/2007 | Kim et al. | 370/276 |
| 2007/0286156 | A1 | 12/2007 | Gormley et al. | |
| 2008/0032671 | A1 * | 2/2008 | Karabinis | 455/412.1 |

FOREIGN PATENT DOCUMENTS

WO WO 2005/088866 A1 9/2005

OTHER PUBLICATIONS

International Search Report and Written Opinion of PCT/US2009/00068 mailed Mar. 30, 2009.

* cited by examiner

*Primary Examiner* — Thai Nguyen
(74) *Attorney, Agent, or Firm* — Fay Sharpe, LLP

(57) ABSTRACT

Systems and methods are disclosed for using two TDD carriers in the same paired spectrum by offsetting the DL and UL transmissions in frequency to cause the TDD carriers to behave as two half-duplex FDD carriers. DL and UL transmission and reception periods are predefined such that only one of the TDD carriers is transmitting on the DL at any instant in time while the other TDD carrier is transmitting on the UL.

18 Claims, 4 Drawing Sheets

REALIZING FDD CAPABILITY BY LEVERAGING EXISTING TDD TECHNOLOGY

BACKGROUND

By way of background, current conventional worldwide interoperability for microwave access (WiMAX) profiles do not support frequency division duplexed (FDD) communication protocols. The 802.16e standard mentions an FDD option, but the FDD option in 802.16e requires a totally new frame structure (e.g., ASICs and software). The FDD option as described in 802.16e requires laborious and time-consuming debugging procedures, and, if it were to be implemented, would require substantial effort and time to define and develop a system since it is so substantially different from the current WAVE 1 and WAVE 2 WiMAX time division duplexed (TDD) profiles.

Thus, a major disadvantage of conventional WiMAX profiles is that they only support TDD communication. In many new frequency bands (e.g. AWS and 700 MHz in the US), TDD technology is essentially restricted because these are paired bands and intended to support FDD technologies.

There is an unmet need in the art for systems and methods that resolve the above-referenced deficiencies and others.

SUMMARY

A method and apparatus for using TDD transmission carriers, frame structure, ASICs, and software to define an FDD communication solution are provided.

In one aspect, a cellular communication system comprises a base transmission station (BTS) that transmits information on a downlink (DL) frequency band to one or more mobile devices and receives information on an uplink (UL) frequency band from the one or more mobile devices, and a frequency division duplex (FDD) processor that alternately applies first and second time division duplexed (TDD) carriers to a transmission signal on the DL frequency band according to a predefined switching schedule. The system further comprises a memory that stores information related to the predefined switching schedule, TDD carrier identity, and DL and UL frequency bands.

According to another aspect, a method of using existing TDD communication structures to perform FDD communication, comprises transmitting a DL signal on a DL frequency band using a first TDD carrier during a first portion of a transmission frame, receiving a UL signal on a UL frequency band using a second TDD carrier during the first portion of the transmission frame, and transmitting the DL signal on the DL frequency band using the second TDD carrier during a second portion of the transmission frame. The method further comprises receiving the UL signal on the UL frequency band using the first TDD carrier during the second portion of the transmission frame, and switching from the first TDD carrier to the second TDD carrier on the DL frequency band, and from the second TDD carrier to the first TDD carrier on the UL frequency band, during a first transition gap that occurs between the first and second portions of the transmission frame.

According to another aspect, a system that facilitates wireless communication by causing two TDD carriers to behave as half-duplex FDD carriers comprises means for transmitting a DL signal on a DL frequency band using a first TDD carrier during a first portion of a transmission frame, means for receiving a UL signal on a UL frequency band using a second TDD carrier during the first portion of the transmission frame, and means for transmitting the DL signal on the DL frequency band using the second TDD carrier during a second portion of the transmission frame. The system further comprises means for receiving the UL signal on the UL frequency band using the first TDD carrier during the second portion of the transmission frame, and means for switching from the first TDD carrier to the second TDD carrier on the DL frequency band, and from the second TDD carrier to the first TDD carrier on the UL frequency band, during a first transition gap that occurs between the first and second portions of the transmission frame. Additionally, the system comprises means for switching from the second TDD carrier to the first TDD carrier on the DL frequency band, and from the first TDD carrier to the second TDD carrier on the UL frequency band, during a second transition gap that occurs at the end of the transmission frame. Transmission, reception, and carrier switching are performed iteratively across multiple transmission frames during a communication event.

An advantage of the various aspects described herein is that an FDD solution for frequency bands where TDD solutions are restrictive is created.

Another advantage resides in enabling vendors to leverage and/or re-use the current frame structure, ASICs, and software of the TDD solution in implementing the FDD option.

A further advantage resides in reducing cost for vendors and operators by leveraging the economies of scale of TDD solutions in implementing the FDD option.

Yet another advantage resides in providing spectral efficiency close to a true FDD solution.

Another advantage resides in reducing terminal cost relative to a full duplex FDD solution by utilizing half-duplex terminals that do not require a duplexer.

Yet another advantage resides in leveraging the current TDD solution to provide a faster time-to-market FDD option than can be achieved using the 802.16e standards-defined FDD solution.

Further scope of the applicability of the described innovation will become apparent from the detailed description provided below. It should be understood, however, that the detailed description and specific examples, while indicating various embodiments of the invention, are given by way of illustration only, since various changes and modifications within the spirit and scope of the invention will become apparent to those skilled in the art.

DESCRIPTION OF THE DRAWINGS

The invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

This invention relates to a method and apparatus for leveraging existing TDD ASICs, software, and infrastructure to provide FDD communication capability by switching 802.16e-defined WiMAX TDD carriers between two transmission frequency bands mid-frame, thereby causing the TDD carriers to behave as half duplex FDD carriers.

While the invention is particularly directed to the art of cellular communication, and will be thus described with specific reference thereto, it will be appreciated that the invention may have usefulness in other fields and applications. For example, the invention may be used in communication devices, gaming devices, or any other devices in which it is desirable to improve frequency reuse, reduce interference, etc.

Figure 1:
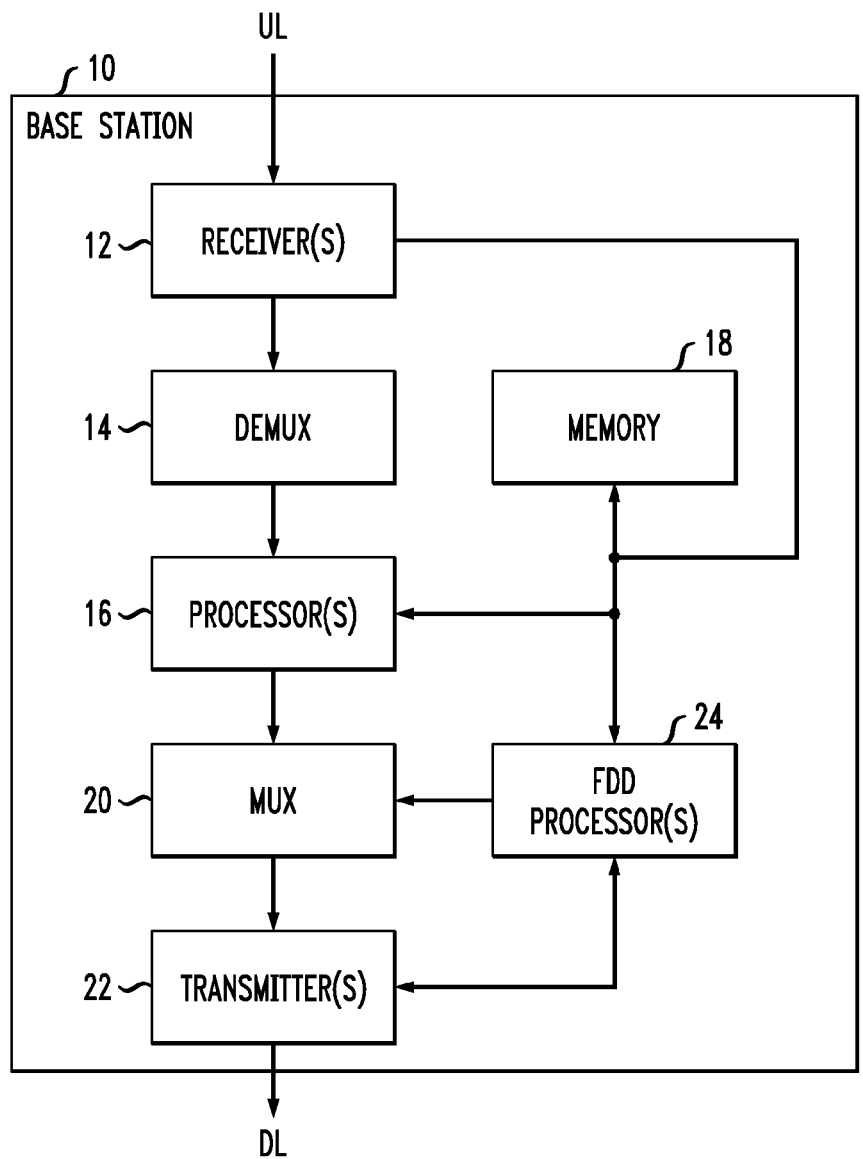
FIG. 1 illustrates a system for providing frequency division duplexed (FDD) communication using a time division duplexed (TDD) architecture, in accordance with various aspects described herein.

Referring now to the drawings wherein the showings are for purposes of illustrating the exemplary embodiments only and not for purposes of limiting the claimed subject matter, FIG. 1 illustrates a system for providing frequency division duplexed (FDD) communication using a time division duplexed (TDD) architecture, in accordance with various aspects described herein. According to one aspect, a worldwide interoperability for microwave access (WiMAX) FDD solution is defined that leverages existing WiMAX TDD solutions currently based on the currently defined WiMAX TDD profiles, which maximizes the reuse of the TDD WiMAX solution/ecosystem. This and other aspects described herein can be applied to other TDD wireless air technologies, and are not limited to WiMAX.

In one embodiment, the WiMAX FDD solution maintains the frame structure as the WAVE 1 & 2 WiMAX TDD profiles and effects a change at the radio frequency (RF) level to support transmission and reception in different frequency bands, thereby facilitating leveraging the ASICs and software designed and developed for the WAVE 1 & 2 WIMAX TDD solutions. Accordingly, a WiMAX FDD solution is described herein that is different from the 802.16e standards-defined FDD solution.

The system illustrated in FIG. 1 comprises a base transceiver station (BTS) 10 that includes one or more receivers 12 for receiving information on an uplink (UL), or reverse link, from one or more mobile devices (not shown). The receiver 12 is coupled to a demultiplexer/demodulator 14 that demultiplexes and/or demodulates received information signals from one or more mobile devices. A processor 16 receives the demultiplexed signal data, and is coupled to a machine-readable memory 18 that stores information related to signal processing and the like. In one embodiment, the memory 18 stores algorithms for performing various functions associated with wireless and/or cellular communication, including but not limited to demultiplexing signals received on the uplink, processing information contained in the signals, generating and multiplexing signals for transmission on a downlink (DL), or forward link, and any other suitable communication protocols, as will be appreciated by those of skill. The processor 16 is coupled to a multiplexer 20 that multiplexes and/or modulates transmission signals generated or relayed by the processor 16 for transmission by one or more transmitters 22 on the downlink to one or more mobile devices (not shown).

The receiver 12, demux 14, processor 16, memory 18, multiplexer 20, and transmitter(s) 22 are further coupled to an FDD processer 24 that executes instructions for performing FDD communication protocols using TDD infrastructure and software. For example, the FDD processor 24 can use two TDD carriers in the same paired spectrum by off-setting the DL and UL transmissions in frequency (e.g., using two half-duplex FDD carriers) and by defining DL and UL transmission/reception periods such that only one of the TDD carriers transmits on the DL at any given instant in time (while the second TDD carrier transmits on the UL), as described below with regard to FIG. 3. According to one embodiment, the BTS transmits on the DL frequency band using a first TDD carrier for a first portion of a transmission frame, and using a second TDD carrier for a second portion of the transmission frame, wherein the first portion of the transmission frame comprises N symbols, where N is a positive integer, and the second portion of the transmission frame comprises M-N symbols, where M is the number of symbols per frame.

Figure 2:
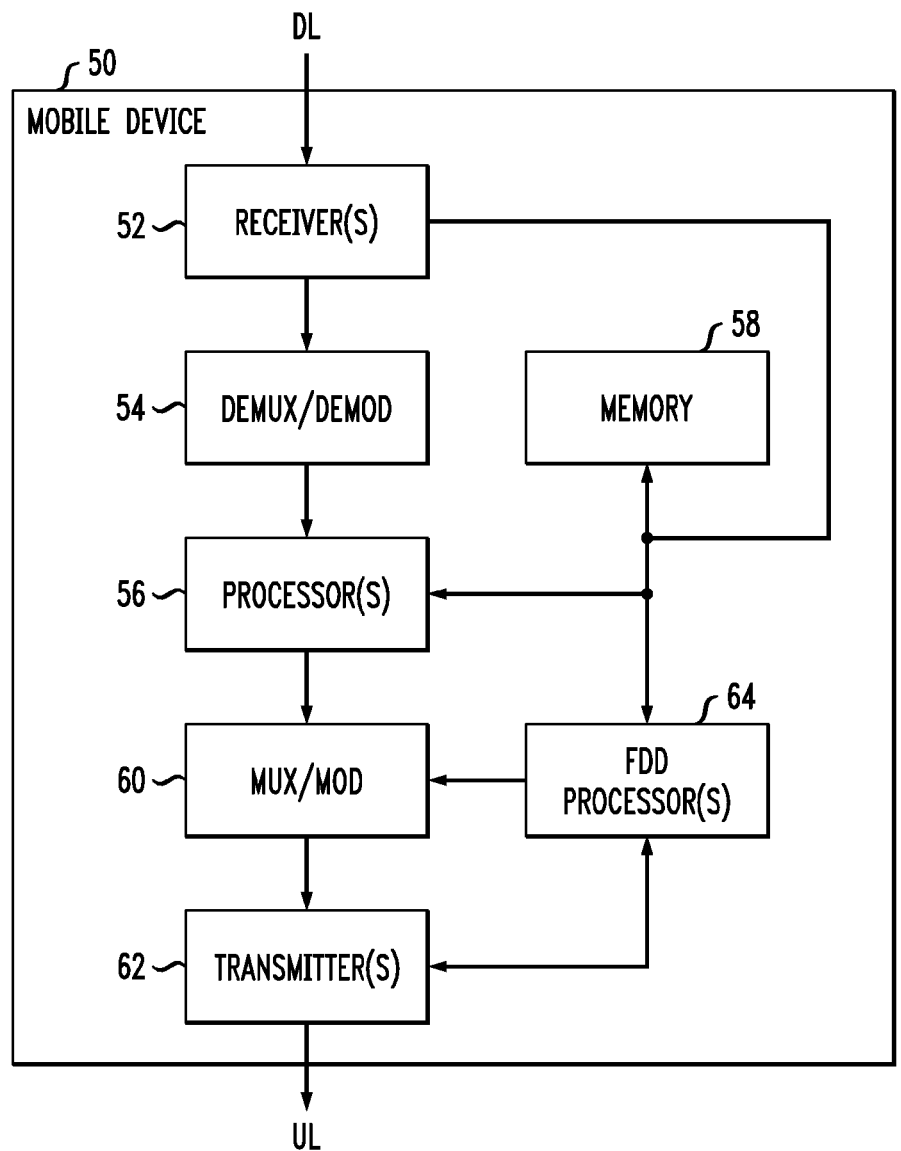
FIG. 2 illustrates a mobile device that can be employed for FDD communication with the BTS.

FIG. 2 illustrates a mobile device 50 that can be employed for FDD communication with the BTS 10. The mobile device 50 may be a cellular phone, a laptop, a smart phone, a wireless computing device, or some other suitable wireless communication device. The mobile device 50 comprises one or more receivers 52 for receiving information on the DL from one or more base stations (FIG. 1). The receiver 52 is coupled to a demultiplexer/demodulator 54 that demultiplexes and/or demodulates received information signals from the base station(s). A processor 56 receives the demultiplexed signal data, and is coupled to a machine-readable memory 58 that stores information related to signal processing and the like. In one embodiment, the memory 58 stores algorithms for performing various functions associated with wireless and/or cellular communication, including but not limited to demultiplexing signals received on the downlink, processing information contained in the signals, generating and multiplexing signals for transmission on the UL, and any other suitable communication protocols, as will be appreciated by those of skill. The processor 56 is coupled to a multiplexer 60 that multiplexes and/or modulates transmission signals generated or relayed by the processor 56 for transmission by one or more transmitters 62 on the DL to one or more base stations.

The receiver 52, demux/demod 54, processor 56, memory 58, multiplexer 60, and transmitter(s) 62 are further coupled to an FDD processer 64 that executes instructions for performing FDD communication protocols using TDD infrastructure and software. For example, the FDD processor 64 can use two TDD carriers in the same paired spectrum by off-setting DL and UL transmissions in frequency (e.g., using two half-duplex FDD carriers) and by defining DL and UL transmission/reception periods such that only one of the TDD carriers transmits on the DL at any given instant in time (while the second TDD carrier transmits on the UL), as described below with regard to FIG. 3.

Figure 3:
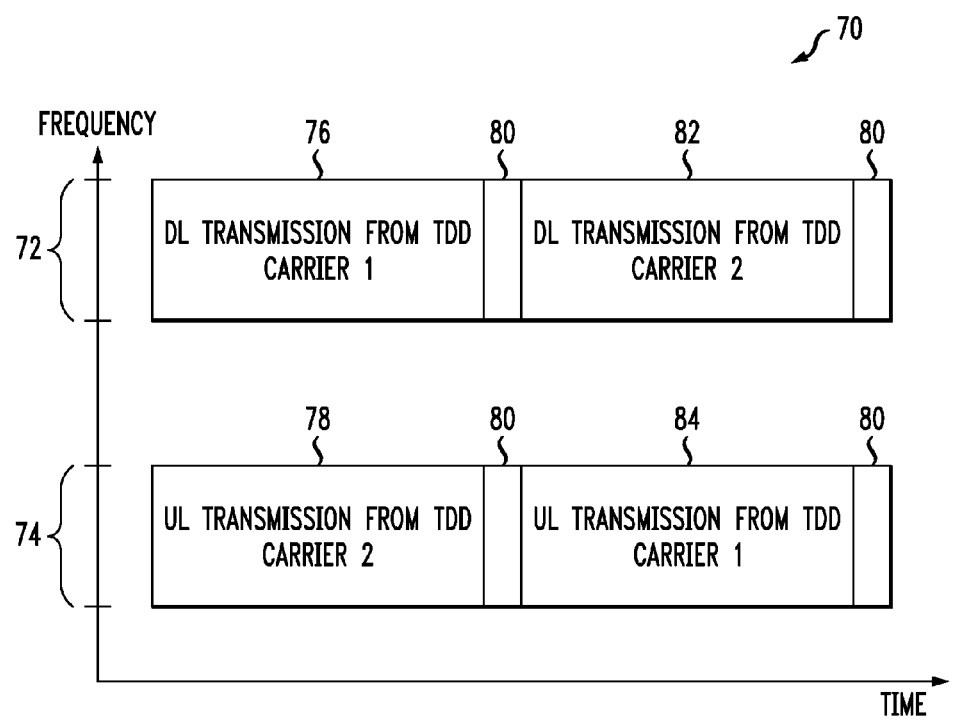
FIG. 3 is an illustration of a transmission/reception scheme 70, such as may be executed by the FDD processor, in accordance with various aspects described herein.

FIG. 3 is an illustration of a transmission/reception scheme 70, such as may be executed by the FDD processor, in accordance with various aspects described herein. With this communication protocol, the BTS and mobile terminals can behave as though they are employing a TDD communication protocol, with a modification to frequency translation for DL vs. UL transmission. The BTS utilizes the entire paired frequency bandwidth, which comprises two paired frequency bands 72, 74, thus achieving spectral efficiency similar to a true FDD system. The first frequency band 72 is dedicated to DL transmission, and the second transmission band 74 is dedicated to uplink transmission. According to an example, the first frequency band 72 is approximately 1710 kHz to 1755 kHz, and the second frequency band 74 is approximately 2110 kHz to 2155 kHz. In other examples, the paired spectrum of frequency bands 72, 74 is consistent with a global system for mobile (GSM) communication paired spectrum band, such as T-GSM 380 T-GSM 410, GSM 450, GSM 480, GSM 710, GSM 750, T-GSM 810, GSM 850, P-GSM 900, E-GSM 900, R-GSM 900, T-GSM 900, DCS 1800, PCS 1900, or the like. It will be appreciated that the described aspects are not limited to the foregoing paired spectrum bandwidths, but rather may be used in conjunction with any suitable paired spectrum bandwidths.

The communication scheme 70 shows frequency as a function of time, wherein a first DL transmission period 76 permits DL transmission to occur using a first TDD carrier (TDD Carrier 1) over the first frequency band 72, while a first UL transmission period 78 permits UL transmission over the second frequency band 74 using a second TDD carrier (TDD Carrier 2). At a predetermined time, a transition period 80 is executed, wherein neither UL nor DL transmission occurs. In one example the transition period has a duration of approximately 60 μs, although other durations are contemplated. During the transition period, the carriers are switched so that during a second DL transmission period 82, DL transmission occurs on the first frequency band 72 using the second TTD carrier, and UL transmission occurs over the second frequency band 74 using the first TDD carrier. Thus, the transition period is employed to ensure that UL and DL transmission does not occur concurrently on both frequency bands using the same TDD carrier, which facilitates the leveraging of the TDD solution. At the end of the second transmission periods 82, 84, another transition period is employed while the respective DL and UL transmission carriers are switched again.

Figure 4:
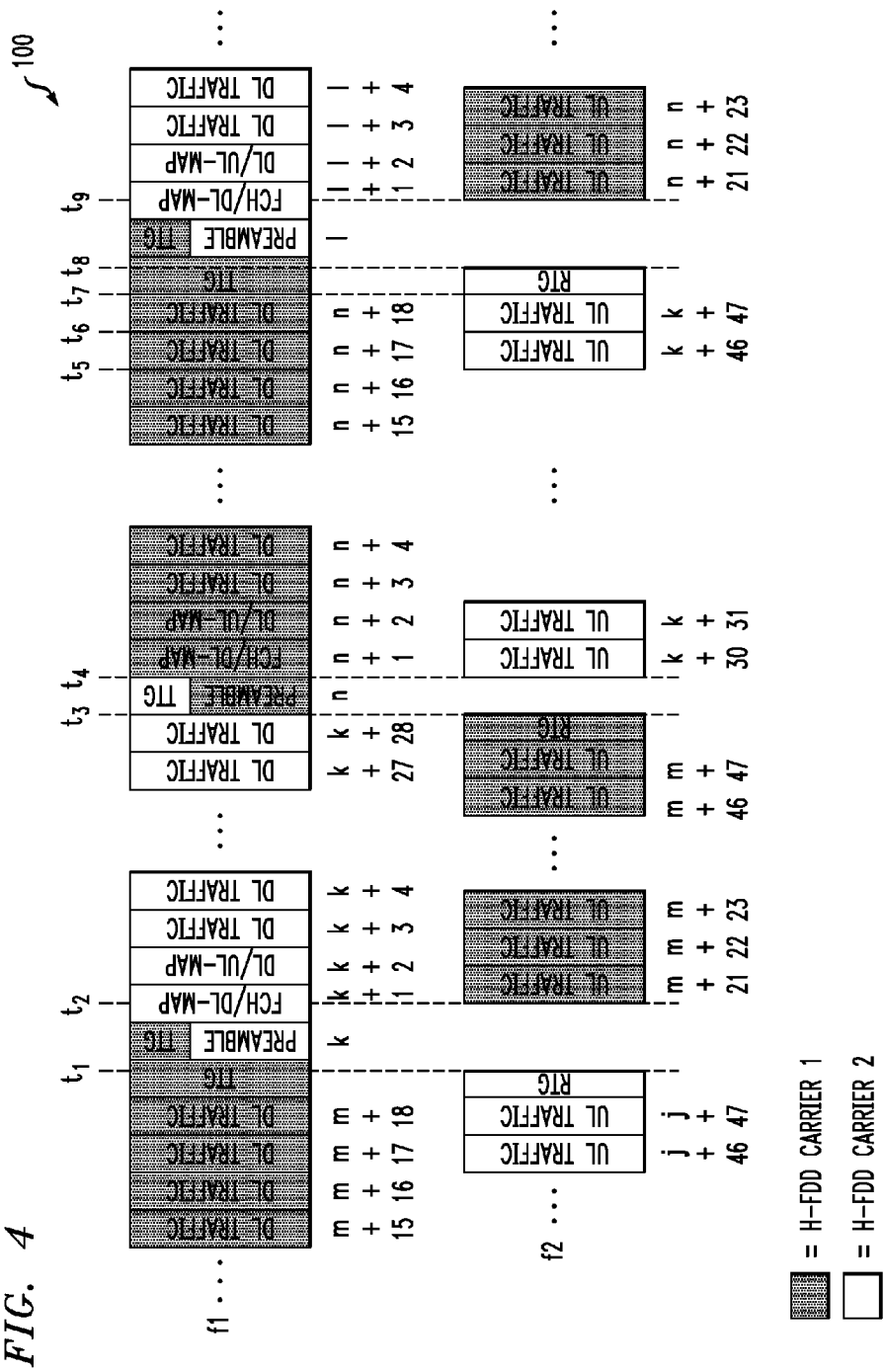
FIG. 4 illustrates an example of an 802.16e-based WiMAX FDD transmission scheme that uses two "802.16e WiMAX TDD carriers" with DL and UL transmissions translated to first and second frequency bands f1 and f2, respectively, which results in respective half-FDD (H-FDD) carriers.

FIG. 4 illustrates an example an 802.16e-based WiMAX FDD transmission scheme 100 that uses two "802.16e WiMAX TDD carriers" with DL and UL transmissions translated to first and second frequency bands f1 and f2, respectively, which results in respective half-FDD (H-FDD) carriers. The two TDD carriers are illustrated as shaded (H-FDD Carrier 1) and unshaded (H-FDD Carrier 2) symbols over several transmission frames. A transmission frame, in one example, comprises 47 symbols, each of which is approximately 100 μs long. The first and second TDD carriers can be distinguished from each other by using two different preambles, for example. Initially, a mobile device searches all preambles to find one that produces a high correlation (e.g., mobiles are programmed to search the preambles in different orders depending on a given mobile's configuration).

The illustrated example demonstrates how one WiMAX H-FDD carrier using DL:UL symbol ratio of 29:18 can be combined with a second WiMAX H-FDD carrier using a 19:27 DL:UL symbol ratio. The figure also demonstrates how a time offset of the preamble of H-FDD carrier 2 is applied so that the preamble is transmitted during the transmission time gap (TTG) interval of the first H-FDD carrier. No data is transmitted using the first H-FDD carrier during the TTG, and the UL of the first H-FDD carrier is transmitted in frequency f2. Accordingly, only the preamble/FCH/DL and UL/DL-MAP traffic from H-FDD carrier 1 is transmitted from time $t_1$ through $t_2$, which may be approximately 1.8 ms in one example. At this point, a mobile device will perceive two preambles in the DL frequency band f1. Due to randomness, some mobiles will lock onto the preamble from H-FDD carrier 1 while others will lock onto H-FDD carrier 2. If a situation occurs where a disproportionate number of mobiles lock onto one of the carriers, then load balancing procedures can be used to move users from the more heavily loaded carrier to the less heavily loaded carrier, as will be appreciated by those of skill.

As illustrated, DL transmission occurs on frequency f1 for a period (illustrated by an ellipsis). After symbol m18 in an $m^{th}$ frame, a transmit time gap (TTG) occurs, which may be on the order of approximately 150 μs, for instance. Concurrently with DL transmission on band f1 using H-FDD carrier 1, UL transmission occurs over frequency band f2 using H-FDD carrier 2 until the end of a $j^{th}$ frame at symbol j47. Upon completion of the $j^{th}$ frame, a receive time gap (RTG) occurs, which may be on the order of approximately 60 μs (e.g., or less than one symbol in duration). DL transmission then switches to H-FDD carrier 2 on frequency band f2, and a preamble is transmitted therefor to permit mobile devices to identify the new carrier on the DL frequency band f2. Frame control header (FCH) information for the DL is then transmitted on a $k^{th}$ frame (e.g., which follows the completed $j^{th}$ frame of H-FDD carrier 1), followed by DL and UL mapping information describing transmission schedules for the mobile devices. Meanwhile, the $m^{th}$ frame of H-FDD carrier 2 resumes with symbol m21 on UL transmission frequency band f2. In this example, $m^{th}$ frame symbols m19 and m20 (e.g., approximately 200 μs) are not used for transmission, since the transition time (e.g., between times $t_1$ and $t_2$) for switching carriers between the frequency bands f1 and f2 occupies a period of approximately 150 μs that overlaps with these two symbols.

Upon completion of the $47^{th}$ symbol in the $m^{th}$ frame of H-FDD carrier 1 on frequency band f2, another RTG period occurs while DL transmission occurs on frequency band f1 using H-FDD carrier 2 during symbol k28. A transition gap occurs between times $t_3$ and $t_4$, and may be on the order of approximately 100 μs (e.g., one symbol) in duration, during which H-FDD carrier 1 preamble information is transmitted on frequency band f1 as carrier 1 begins an $n^{th}$ frame of transmission. During symbol n1 of carrier 1 on frequency band f1, FCH and DL map information are transmitted, while UL transmission resumes on frequency band f2 using carrier 2 at symbol k30. It will be noted that symbol k29 is omitted from the illustration since it overlaps with the transition gap as carriers 1 and 2 are switched between frequency bands f1 and f2.

In another example using approximate time values, a series of time points are illustrated, labeled $t_1$-$t_9$. If $t_1$ occurs at 5.0 ms, then $t_2$ may occur at approximately 5.15 ms, for instance. The temporal value of $t_3$ may be approximately 7.98 (e.g., approximately 28 symbols having a duration of 100 μs each). Time $t_4$ may then occur at 8.09 ms (e.g., approximately 100 μs after $t_3$). Time $t_5$ may occur at approximately 9.73 ms, or approximately 16 symbols (e.g., 1.8 ms) after $t_4$. Since symbols are approximately 100 μs in length, times $t_6$ and $t_7$ may occur at approximately 9.84 and 9.94 ms, respectively. Time $t_8$ may occur at approximately 10.0 ms, following a 60 μs RTG that begins at $t_7$. Time $t_9$ occurs at approximately 10.15 ms, after a carrier transition gap that begins at $t_8$.

It will be appreciated that the foregoing examples are illustrative in nature and that the carrier switching scheme described herein is not limited to the specific temporal mapping, symbol identities, transition gap durations, frequency bands, UL:DL ratios, etc., described above.

The above description merely provides a disclosure of particular embodiments of the invention and is not intended for the purposes of limiting the same thereto. As such, the invention is not limited to only the above-described embodi-

We claim:

1. A cellular communication system, comprising:
   a base transmission station (BTS), that transmits information on a downlink (DL) frequency band to one or more mobile devices and concurrently receives information on an uplink (UL) frequency band from the one or more mobile devices;
   a frequency division duplex (FDD) processor that alternately applies first and second time division duplexed (TDD) carriers to a transmission signal on the DL frequency band with downlink transmissions according to a predefined switching schedule, and employs a receive time gap (RTG) on the UL frequency band immediately preceding each of a plurality of transition gaps to prevent concurrent transmission on the DL frequency band and reception on the UL frequency using the same TDD carrier; and
   a memory that stores information related to the predefined switching schedule, TDD carrier identity, and DL and UL frequency bands, wherein the BTS transmits the downlink transmissions on the DL frequency band using the first TDD carrier for a first portion of a downlink transmission frame, and using the second TDD carrier for a second portion of the downlink transmission frame, and wherein the BTS receives uplink transmissions on the UL frequency band using the second TDD carrier for a first portion of an uplink transmission frame, and using the first TDD carrier for a second portion of the uplink transmission frame, wherein TDD carriers are shared between uplink and downlink frequencies in an alternating fashion.

2. The system of claim 1, wherein the FDD processor applies the first TDD carrier to the transmission signal during the first portion of the downlink transmission frame and applies the second TDD carrier to the transmission signal during the second portion of the downlink transmission frame, and applies a first transition gap during which the FDD processor switches from the first TDD carrier to the second TDD carrier.

3. The system of claim 2, wherein the BTS does not receive information on the UL frequency band during the first transition gap.

4. The system of claim 3, wherein the first portion of the downlink transmission frame comprises N symbols, where N is a positive integer, and the second portion of the downlink transmission frame comprises M-N symbols, where M is the number of symbols per frame.

5. The system of claim 4, wherein the FDD processor applies a second transition gap during which the FDD processor switches from the second TDD carrier to the first TDD carrier for transmission of a first portion of a next transmission frame on the DL frequency band.

6. The system of claim 5, wherein the second transition gap is shorter than the first transition gap.

7. The system of claim 5, further comprising a receive time gap (RTG) on the UL frequency band immediately preceding each transition gap to prevent concurrent transmission on the DL frequency band and reception on the UL frequency band using the same TDD carrier.

8. The system of claim 7, further comprising a transmission time gap (TTG) during a symbol preceding the first transition gap to prevent concurrent transmission on the DL frequency band and reception on the UL frequency using the same TDD carrier.

9. The system of claim 1, wherein the BTS receives information on the UL frequency band using the second TDD carrier during the first portion of the uplink transmission frame, and receives information on the UL frequency band using the first TDD carrier during the second portion of the uplink transmission frame.

10. The system of claim 1, wherein the first and second TDD carriers are Worldwide Interoperability for Microwave Access (WiMax) TDD carriers.

11. A method that facilitates wireless communication by causing two time division duplexed (TDD) carriers to behave as half-duplex frequency division duplex (FDD) carriers, comprising:
   transmitting a DL signal on a DL frequency band using a first TDD carrier during a first portion of a transmission frame;
   receiving a UL signal on a UL frequency band using a second TDD carrier during the first portion of the transmission frame;
   transmitting the DL signal on the DL frequency band applying the second TDD carrier during a second portion of the transmission frame;
   receiving the UL signal on the UL frequency band applying the first TDD carrier during the second portion of the transmission frame, wherein TDD carriers are shared between uplink and downlink frequencies in an alternating fashion;
   switching from the first TDD carrier to the second TDD carrier on the DL frequency band, and from the second TDD carrier to the first TDD carrier on the UL frequency band, during a first transition gap that occurs between the first and second portions of the transmission frame; and
   switching from the second TDD carrier to the first TDD carrier on the DL frequency band, and from the first TDD carrier to the second TDD carrier on the UL frequency band, during a second transition gap that occurs at the end of the transmission frame; and
   employing a receive time gap (RTG) on the UL frequency band immediately preceding each transition gap to prevent concurrent transmission on the DL frequency band and reception on the UL frequency using the same TDD carrier.

12. The method of claim 11, further comprising temporarily stopping reception on the UL during first transition gap.

13. The method of claim 12, wherein the first portion of the transmission frame comprises N symbols, where N is a positive integer, and the second portion of the transmission frame comprises M-N symbols, where M is the number of symbols per frame.

14. The method of claim 11, wherein the second transition gap is shorter than the first transition gap.

15. The method of claim 11, further comprising employing a transmission time gap (TTG) during the symbol preceding the first transition gap to prevent concurrent transmission on the DL frequency band and reception on the UL frequency using the same TDD.

16. The method of claim 15, wherein the RTG has a shorter duration than the TTG.

17. The method of claim 11, wherein the first and second TDD carriers are Worldwide Interoperability for Microwave Access (WiMax) TDD carriers.

18. A system that facilitates wireless communication by causing two time division duplexed (TDD) carriers to behave as half-duplex frequency division duplex (FDD) carriers during communication with a base station, comprising:
   one or more transmitters that transmit a DL signal on a DL frequency band using a first TDD carrier during a first portion of a transmission frame;
   one or more receivers that receive a UL signal on a UL frequency band using a second TDD carrier during the first portion of the transmission frame;
   wherein the one or more transmitters transmit the DL signal on the DL frequency band using the second TDD carrier during a second portion of the transmission frame;
   wherein the one or more receivers receive the UL signal on the UL frequency band using the first TDD carrier during the second portion of the transmission frame;
   an FDD processor configured to switch from the first TDD carrier to the second TDD carrier on the DL frequency band, and from the second TDD carrier to the first TDD carrier on the UL frequency band, during a first transition gap that occurs between the first and second portions of the transmission frame; and
   wherein the FDD processor is further configured to switch from the second TDD carrier to the first TDD carrier on the DL frequency band, and from the first TDD carrier to the second TDD carrier on the UL frequency band, during a second transition gap that occurs at the end of the transmission frame;
   wherein transmission, reception, and carrier switching are performed iteratively across multiple transmission frames during a communication event;
   wherein the first and second TDD carriers are 802.16e-based Worldwide Interoperability for Microwave Access (WiMax) TDD carriers.

* * * * *